No. 761,488. PATENTED MAY 31, 1904.
C. J. HIRSCH.
ATTACHMENT FOR FINGER BARS OF MOWERS OR REAPERS.
APPLICATION FILED OCT. 3, 1903.
NO MODEL.
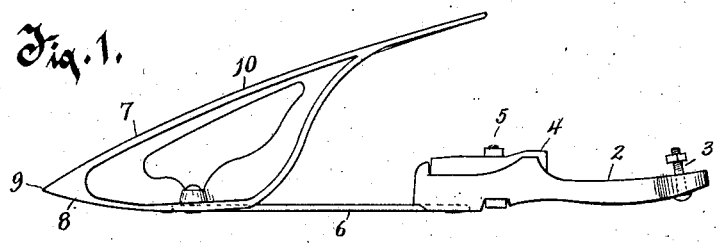
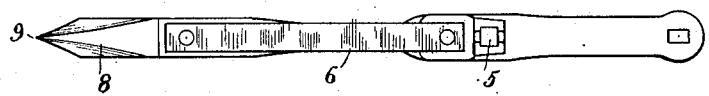
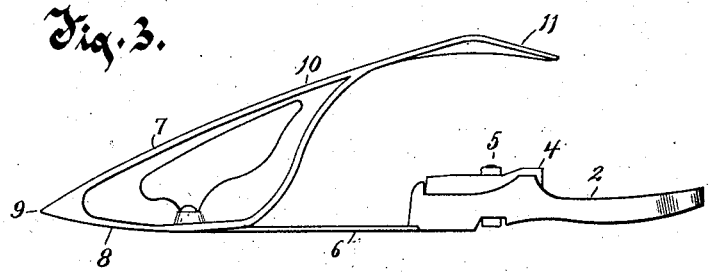
Witnesses.
Inventor.
Charles J. Hirsch No. 761,488. Patented May 31, 1904.

UNITED STATES PATENT OFFICE.

CHARLES J. HIRSCH, OF MILWAUKEE, WISCONSIN.

ATTACHMENT FOR FINGER-BARS OF MOWERS OR REAPERS.

SPECIFICATION forming part of Letters Patent No. 761,488, dated May 31, 1904.

Application filed October 3, 1903. Serial No. 175,554. (No model.)

*To all whom it may concern:*

Be it known that I, CHARLES J. HIRSCH, residing at Milwaukee, in the county of Milwaukee and State of Wisconsin, have invented a new and useful Improvement in Attachments for Finger-Bars of Mowers or Reapers, of which the following is a description, reference being had to the accompanying drawings, which are a part of this specification.

My invention relates to devices to be attached to the finger-bar in a mower or harvester, the device being a vine or straw lifter and being attached to the finger-bar of the mower or harvester projects forwardly therefrom and is adapted to lift straw or vines, especially the straw of grain that has been blown down by winds or beaten down by the rain, or matted clover or pea-vines from the ground and lift such straw or vines to such extent that the straw or vines can be readily cut by the knives of the machine, and will then pass over the cutter-bar and fall at the rear thereof.

The object of the present invention is to provide improved devices of this character that are simple and inexpensive in construction, that are strong and durable in quality, and that are especially adapted for and efficient in performing the work of lifting straw or vines and of clearing themselves therefrom.

My improved construction is especially valuable in that it is exceedingly simple in character and obviates all loose joints that are liable to catch and become clogged by and embarrassed with an accumulation of straw or vines that occurs in devices of this general character having hinge-joints and independent springs, especially coiled-wire springs, that are liable to catch and hold vines and straw.

The invention consists of the device, its parts, and combinations, as herein described and claimed, or the equivalents thereof.

In the drawings, Figure 1 is a side elevation of my improved mower attachment in connection with a shoe in common use, adapted to be fastened to the front extremity of a knife-guard on the finger-bar of a mower or harvester. Fig. 2 is a bottom view of the construction shown in elevation in Fig. 1. Fig. 3 is a side elevation of my improved device slightly changed in form from that shown in Fig. 1.

In the drawings, 2 represents a shoe of a form in common use provided with a bolt 3, by means of which bolt the shoe is adapted to be secured to a guard of a knife on a finger-bar of a mower or reaper. This shoe 2 is provided with a cap-piece 4, secured in and covering a portion of a groove in the front end of the shoe, into which groove the front extremity of the knife-guard projects when the shoe is attached thereto. The cap-piece 4 is secured to the shoe 2 by means of a bolt 5 and forms a cover for the front end of the knife-guard.

My improved device is adapted to be secured to the front end of the shoe 2 in its lower surface and extends forwardly thereof, so as to be adapted in use to precede the shoe and the knife-guard when in use.

The improved device consists of an elastic runner 6, conveniently made of a strip of steel, to the front end of which is secured a pilot member 7, having its under edge inclined or curved upwardly slightly at 8 to the front point 9, from which point the device is carried rearwardly obliquely upwardly, forming a ridge or lifting-bar 10. The pilot member may be a casting and secured rigidly to the front end of the elastic spring runner 6. The front end 9 of the pilot member is only raised so much from the level of the lower edge of the member at the rear thereof and of the runner 6 as to prevent its digging into the ground, but is still so close to the ground as to pass under straw or vines lying very close to the ground, whereby the pilot member will run under the vines or straw and will lift them from the ground, raising them up on the lifting-bar 10 as the pilot runs under them. The elastic runner 6, while being of sufficient strength to force the pilot under the vines or straw and lift them, is still sufficiently elastic to permit the pilot to follow the irregular contour of the ground closely, thus enabling the pilot to surely get beneath vines or straw as it advances through the mass. The construction being without any hinge-joint or independent and exposed spring is not liable to and does not catch and hold pea-vines or straw to the detriment of its successful use.

In the form shown in Fig. 3 the rear portion 11 of the ridge-bar is turned or bent slightly downwardly, so as readily to relieve itself from vines or straw.

What I claim as my invention is—

1. An attachment for a finger-bar of a mower or reaper, consisting of an elongated elastic runner adapted to be secured to the finger-bar in front thereof, and a rigid pilot member secured to and carried on the front free end of the elastic runner, the pilot member having a rigid rearwardly and obliquely diverging lifting-bar opposite to the runner.

2. In combination with a finger-bar of a mower or reaper, a vine or straw lifter, comprising a substantially straight elongated elastic runner secured to the finger-bar and projecting in front thereof, and a rigid lifting-bar fast to and carried on the elastic runner at its front end and extending rearwardly obliquely upwardly therefrom.

3. In combination, a substantially straight elastic runner, a rigid pilot secured to the front end of the runner and diverging rearwardly in a rigid bar from and opposite to and in a plane with the elastic runner, the rear end of the runner being adapted to be secured without a movable joint to the finger-bar of a mower or reaper.

In testimony whereof I affix my signature in presence of two witnesses.

CHARLES J. HIRSCH.

Witnesses:
C. T. BENEDICT,
ANNA F. SCHMIDTBAUER.